United States Patent
Gomez

[11] Patent Number: 5,831,813
[45] Date of Patent: Nov. 3, 1998

[54] BREAKER BOX FRONT PANEL WITH WINDOW ASSEMBLY

[76] Inventor: Thomas Gomez, 325 W. Arlight St., Monterey, Calif. 91754

[21] Appl. No.: 823,451

[22] Filed: Mar. 24, 1997

[51] Int. Cl.$^6$ ................................................. H02B 1/26
[52] U.S. Cl. ........................... 361/622; 361/641; 361/643; 361/644; 361/654; 361/658; 200/50.1; 200/50.18; 200/50.22; 200/50.26
[58] Field of Search ................................. 361/622, 644, 361/645, 627; 200/50.18, 50.1, 50.22, 50.26

[56] References Cited

U.S. PATENT DOCUMENTS

| | | | |
|---|---|---|---|
| 3,748,619 | 7/1973 | Chambon | 337/9 |
| 3,761,778 | 9/1973 | Willard | 361/54 |
| 4,514,723 | 4/1985 | Leal | 337/241 |
| 4,680,672 | 7/1987 | May et al. | 361/634 |
| 5,081,560 | 1/1992 | Donnerstag | 361/644 |

*Primary Examiner*—Leo P. Picard
*Assistant Examiner*—Boris L. Chervinsky

[57] ABSTRACT

A breaker box front panel with window assembly including a breaker box and a plurality of switches situated within an interior space of the breaker box. The switches are connected between ends of a pair of associated wires which are situated adjacent the corresponding switch. The wires include a first wire connected to a power source and a second wire connected to an appliance. The switches have a first orientation for allowing transmission of power from the power source to the appliance and a second orientation for precluding transmission of power from the power source to the appliance. Further provided is a front panel secured about a front opening of the breaker box. The front panel is adapted to allow the manipulation of the switches and have at least one cut out vertically formed therein. As such, the wires associated with each switch can be seen through the cut out. Lastly, at least one transparent window is situated in each cutout of the front panel for precluding access to the interior space and further allowing viewing of the wires associated with each switch. In use, the user may determine whether a switch is being used by ascertaining the presence of an associated pair of wires without the removal of the front panel.

1 Claim, 2 Drawing Sheets

BREAKER BOX FRONT PANEL WITH WINDOW ASSEMBLY

BACKGROUND OF THE INVENTION

1. Field of the Invention

The present invention relates to a breaker box front panel with window assembly and more particularly pertains to allowing a user to determine whether a switch of a breaker is being used by ascertaining the presence of an associated pair of wires without the removal of the front panel.

2. Description of the Prior Art

The use of breaker boxes is known in the prior art. More specifically, breaker boxes heretofore devised and utilized for the purpose of protecting appliances are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,081,560 to Donnerstag; U.S. Pat. No. 5,134,543 to Sharp et al.; U.S. Pat. No. 4,827,231 to Cheski et al.; U.S. Pat. No. Des. 318,652 to Buchanan; and U.S. Pat. No. 5,277,308 to Finke et al.

In this respect, the breaker box front panel with window assembly according to the present invention substantially departs from the conventional concepts and designs of the prior art, and in so doing provides an apparatus primarily developed for the purpose of allowing a user to determine whether a switch of a breaker is being used by ascertaining the presence of an associated pair of wires without the removal of the front panel.

Therefore, it can be appreciated that there exists a continuing need for a new and improved breaker box front panel with window assembly which can be used for allowing a user to determine whether a switch of a breaker is being used by ascertaining the presence of an associated pair of wires without the removal of the front panel. In this regard, the present invention substantially fulfills this need.

SUMMARY OF THE INVENTION

In view of the foregoing disadvantages inherent in the known types of breaker boxes now present in the prior art, the present invention provides an improved breaker box front panel with window assembly. As such, the general purpose of the present invention, which will be described subsequently in greater detail, is to provide a new and improved breaker box front panel with window assembly which has all the advantages of the prior art and none of the disadvantages.

To attain this, the present invention essentially comprises a breaker box with a rear face and a periphery integrally coupled thereto and extending outwardly therefrom. Such rear face and periphery define an unillustrated interior space with a front opening. Further provided is at least one column of a plurality of rows of switches situated within the interior space of the breaker box. The switches are connected between ends of a pair of associated wires which are situated to the side of the corresponding switch. It should be noted that the wires include a first wire and a second wire. As is standard in the art of breaker boxes, the first wire is connected to a power source and the second wire connected to an appliance. In use, the switches each have a first orientation for allowing transmission of power from the power source to the appliance and a second orientation for precluding transmission of power from the power source to the appliance. Upon the presence of a voltage greater than a predetermined amount on the wires, the switch automatically shifts from the first orientation to the second orientation thereof. Secured about the front opening of the breaker box is a front panel. Such coupling is ideally afforded via a plurality of screws. As shown in FIG. 4, the front panel has at least one thin rectangular cut out vertically formed therein. By this structure, the wires associated with each switch can be seen through the cut out. For allowing manipulation of the switches, a plurality of switch covers are each slidable connected to the front panel adjacent the thin cut out thereof. The switch covers are further secured to a corresponding switch. Such securement allows user to manually shift each of the switches from the first orientation to the second orientation thereof without removal of the front panel. Finally, at least one transparent thin rectangular plastic window is situated in each rectangular cutout for precluding access to the interior space. By providing the front panel with a cut out and associated window, a user may determine whether a switch is being used by ascertaining the presence of an associated pair of wires without the removal of the front panel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved breaker box front panel with window assembly which has all the advantages of the prior art breaker boxes and none of the disadvantages.

It is another object of the present invention to provide a new and improved breaker box front panel with window assembly which may be easily and efficiently manufactured and marketed.

It is a further object of the present invention to provide a new and improved breaker box front panel with window assembly which is of a durable and reliable construction.

An even further object of the present invention is to provide a new and improved breaker box front panel with window assembly which is susceptible of a low cost of manufacture with regard to both materials and labor, and which accordingly is then susceptible of low prices of sale to the consuming public, thereby making such breaker box front panel with window assembly economically available to the buying public.

Still yet another object of the present invention is to provide a new and improved breaker box front panel with window assembly which provides in the apparatuses and methods of the prior art some of the advantages thereof, while simultaneously overcoming some of the disadvantages normally associated therewith.

Still another object of the present invention is to allow a user to determine whether a switch of a breaker is being used by ascertaining the presence of an associated pair of wires without the removal of the front panel.

Lastly, it is an object of the present invention to provide a new and improved breaker box front panel with window assembly including a breaker box and a plurality of switches situated within an interior space of the breaker box. The switches are connected between ends of a pair of associated wires which are situated adjacent the corresponding switch. The wires include a first wire connected to a power source and a second wire connected to an appliance. The switches have a first orientation for allowing transmission of power from the power source to the appliance and a second orientation for precluding transmission of power from the power source to the appliance. Further provided is a front panel secured about a front opening of the breaker box. The front panel is adapted to allow the manipulation of the switches and have at least one cut out vertically formed therein. As such, the wires associated with each switch can be seen through the cut out. Lastly, at least one transparent window is situated in each cutout of the front panel for precluding access to the interior space and further allowing viewing of the wires associated with each switch. In use, the user may determine whether a switch is being used by ascertaining the presence of an associated pair of wires without the removal of the front panel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figures 1, 2:
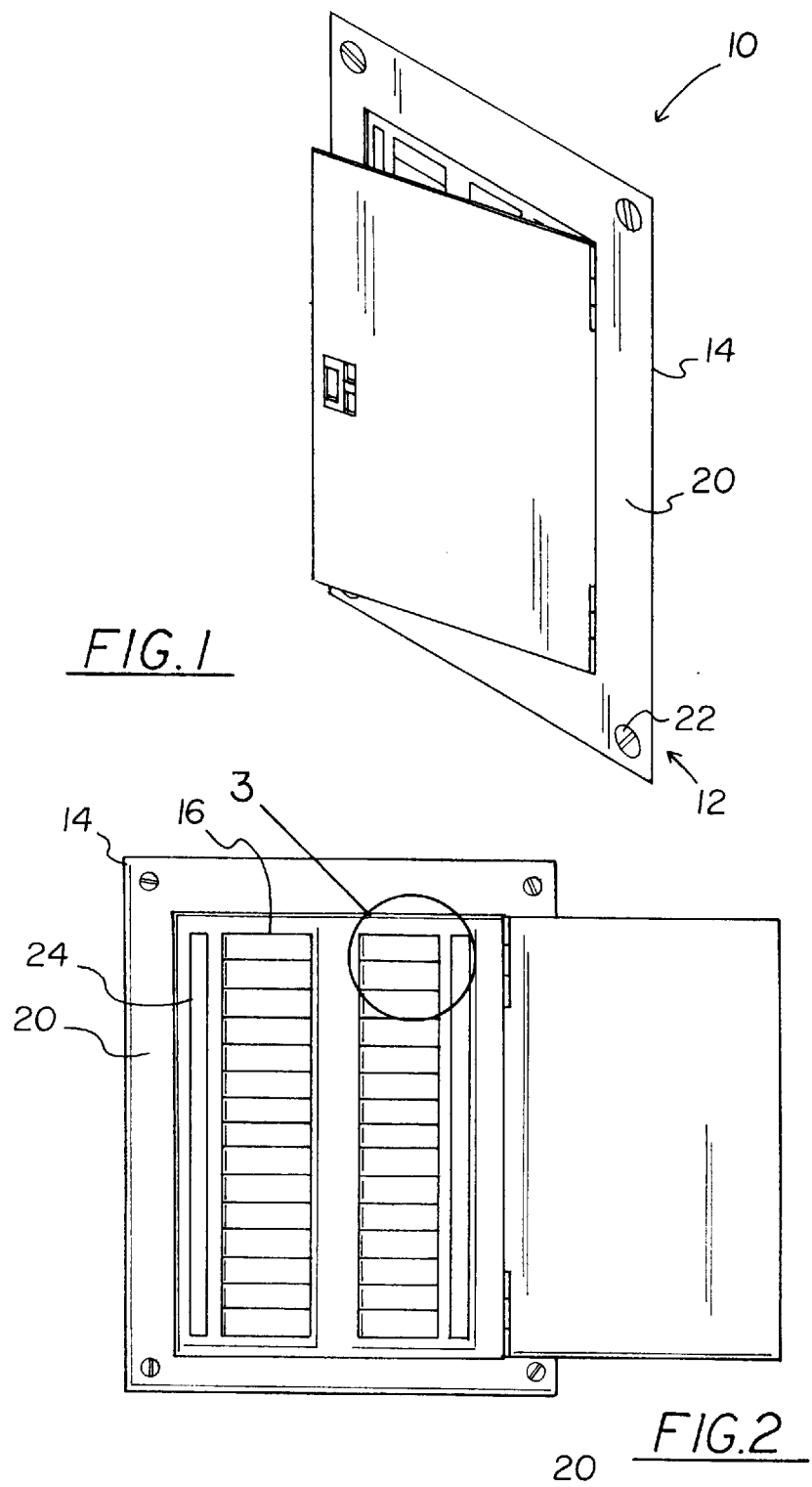
FIG. 1 is a perspective illustration of the preferred embodiment of the breaker box front panel with window assembly constructed in accordance with the principles of the present invention.
FIG. 2 is a front view of the present invention showing the cover in an open orientation.
Figure 3:
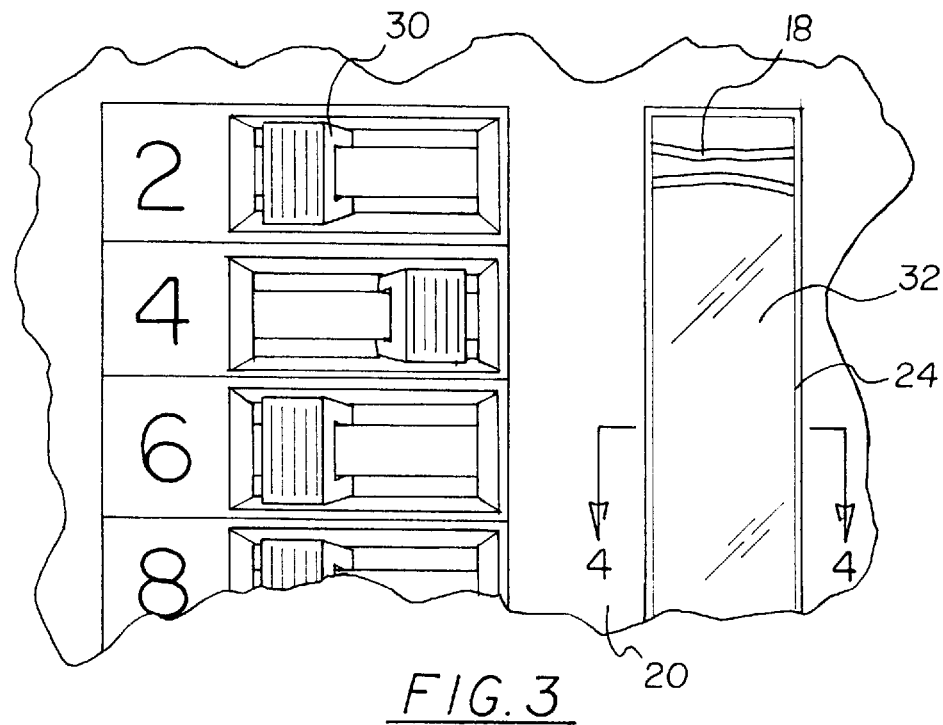
FIG. 3 is close-up view of the encircled portion 3 in FIG. 2.

With reference now to the drawings, and in particular to FIG. 1 thereof, a new and improved breaker box front panel with window assembly embodying the principles and concepts of the present invention and generally designated by the reference numeral 10 will be described.

The present invention, the new and improved breaker box front panel with window assembly, is comprised of a plurality of components. Such components in their broadest context include a breaker box, a front panel, and at least one thin elongated transparent panel. Such components are individually configured and correlated with respect to each other so as to attain the desired objective.

More specifically, it will be noted that the system 10 of the present invention includes a breaker box 12 with a rear face and a periphery integrally coupled thereto and extending outwardly therefrom. Such rear face and periphery define an unillustrated interior space with a front opening 14.

Further provided is at least one column of a plurality of rows of switches 16 situated within the interior space of the breaker box. The switches are connected between ends of a pair of associated wires 18 which are situated to the side of the corresponding switch. It should be noted that the wires include a first wire and a second wire. As is standard in the art of breaker boxes, the first wire is connected to a power source and the second wire connected to an appliance. In use, the switches each have a first orientation for allowing transmission of power from the power source to the appliance and a second orientation for precluding transmission of power from the power source to the appliance. Upon the presence of a voltage greater than a predetermined amount on the wires, the switch automatically shifts from the first orientation to the second orientation thereof.

Figure 4:
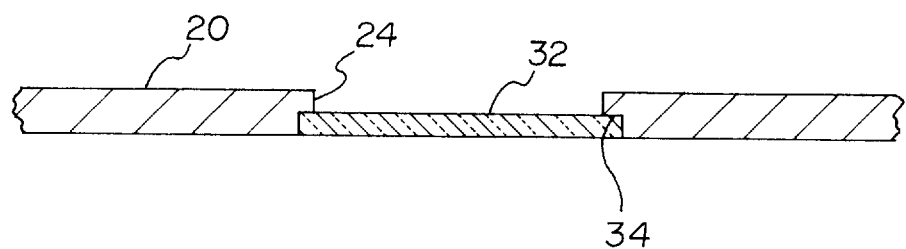
FIG. 4 is a cross-sectional view of the transparent window secured in the associated cut out.

Secured about the front opening of the breaker box is a front panel 20. Such coupling is ideally afforded via a plurality of screws 22. As shown in FIG. 4, the front panel has at least one thin rectangular cut out 24 vertically formed therein adjacent each of the columns of switches. The height of the cut out is equivalent to that of the column of switches. By this structure, the wires associated with each switch can be seen through the cut out. As shown in FIG. 2, it is preferred that two cut outs be formed in the front panel both residing parallel and adjacent to side vertical edges of the front panel. This is ideal when a pair of columns of switches are present. In addition, the width of the cut out ideally does not exceed ¾ of an inch. This is important since only a small area of viewing is necessary as will become apparent later and further space is limited on the front panel.

For allowing manipulation of the switches, a plurality of switch covers 30 are each slidable connected to the front panel adjacent the thin cut out thereof. The switch covers are further secured to a corresponding switch. Such securement allows user to manually shift each of the switches from the first orientation to the second orientation thereof without removal of the front panel.

Finally, at least one transparent thin rectangular plastic window 32 is situated in each rectangular cutout for precluding access to the interior space. To accomplish the securement of the window within the associated cut out, a lip 34 is formed in a periphery of the cut out of the front panel. Also, an adhesive is utilized to secure the window to the lip of the cut out. It should be noted that the transparent window is imperative to preclude entrance of moisture within the breaker box. Further, the transparent window ensures that the wires may not be handled during manipulation of the switch covers. The transparent window further allows viewing of the wires associated with each switch. By providing the front panel with a cut out and an associated window, a user may determine whether a switch is being used by ascertaining the presence of an associated pair of wires without the removal of the front panel.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A breaker box front panel with window assembly comprising, in combination:

a breaker box;

at least one column of a plurality of rows of switches situated within an interior space of the breaker box, the switches connected between ends of a pair of associated wires which are situated to the side of the corresponding switch, the wires including a first wire connected to a power source and a second wire connected to an appliance, the switches having a first orientation for allowing transmission of power from the power source to the appliance and a second orientation for precluding transmission of power from the power source to the appliance, whereby the switch automatically shifts from the first orientation to the second orientation thereof upon the presence of a voltage greater than a predetermined amount;

a front panel secured to the breaker box via a plurality of screws, the front panel having at least one rectangular cut out vertically formed therein adjacent to, spaced from, and in parallel with the column of switches, wherein the cut out has a width of less than ¾ of an inch and the wires associated with each switch can be seen through the cut out;

a plurality of switch covers each being slidable connected to the front panel adjacent the cut out of the front panel and further secured to a corresponding switch, whereby a user may manually shift each of the switches from the first orientation to the second orientation and visa-versa; and at least one transparent rectangular plastic window situated in each rectangular cutout for precluding access to the interior space and further allowing viewing of the wires associated with each switch, whereby a user may determine whether a switch is being used by ascertaining the presence of an associated pair of wires without the removal of the front panels wherein the rectangular cut out has a lip formed therein for supporting the window.

\* \* \* \* \*